United States Patent Office 3,475,475
Patented Oct. 28, 1969

3,475,475
PREPARATION OF DIORGANOZINC COMPOUNDS
Scott H. Eidt, Pasadena, Tex., assignor to
Stauffer Chemical Company
No Drawing. Filed Oct. 6, 1964, Ser. No. 401,990
Int. Cl. C07f 3/06
U.S. Cl. 260—429.9           9 Claims

ABSTRACT OF THE DISCLOSURE

Diorganozinc compounds, particularly dialkylzinc compounds, are produced by the reaction:

$$Zn + AlR_3 + RX \rightarrow ZnR_2 + AlR_2X$$

---

This invention comprises a new and novel method for the preparation of diorganozinc compounds. More particularly, this invention consists of a method for preparation of diorganozinc compounds from zinc dust, organoaluminum compounds and hydrocarbon halides.

Numerous attempts have been made to produce diorganozinc compounds, especially dialkylzinc compounds. One method described in U.S. Patent No. 3,124,604 involves the reaction of zinc chloride with triorganoaluminum compounds to produce a corresponding diorganozinc compound and a diorganoaluminum halide. Another method described in U.S. Patent No. 3,080,409 utilizes this reaction in the presence of an organoaluminum halide included in the original reaction mixture. The principal problem with the above methods is the high consumption of triorganoaluminum compounds amounting to two moles of the aluminum compound converted to a diorganoaluminum halide per mole of diorganozinc produced. Another method of producing the subject diorganozinc compound, especially a dialkyl zinc, is to react zinc dust with an alkyl halide, especially an alkyl iodide. The disadvantages of this last process, however, are relatively low yields and slowness of reaction; therefore, the process is limited to small scale operations such as are to be found in a laboratory.

It is an object of the present invention to provide a new and novel process for the preparation of diorganozinc compounds, in particular dialkylzinc compounds. It is another object of the present invention to provide such a process capable of producing such compounds of high yield and purity. These and other objects which are apparent from the following description and claims are satisfied by this invention.

In the practice of the present invention, it has been found that diorganozinc compounds can be prepared from zinc dust, an organic halide and a triorganoaluminum compound according to the following equation:

$$Zn + AlR_3 + RX \rightarrow ZnR_2 + AlR_2X$$

wherein each R is a monovalent hydrocarbon radical, each X is a halogen atom having an atomic weight of at least 30 and the zinc is in powdered form. By utilizing the described process of the present invention, it has been possible to obtain yields of 83% or better based on the organoaluminum compound.

Each R radical can be any monovalent hydrocarbon radical. While some R radicals can contain as many as 60 carbon atoms, generally each R contains no more than about 18 carbon atoms and preferably no more than about 12 carbon atoms. Of particular interest are the R radicals containing no more than about 6 or 7 carbon atoms. Each R can be saturated, unsaturated, aliphatic, cycloaliphatic, aromatic or combinations of these. Furthermore, each R can be substituted with atoms and groups of atoms (other than carbon and hydrogen) which are inert in the system without being outside the scope of this invention. All the R groups can be the same or different. Where they differ, it is preferable that the total carbon atoms in the R groups on any Zn atom is no more than about 14.

More specifically, each R can be, for example, any alkyl radical such as the methyl, ethyl, propyl, t-butyl, hexyl, 2-ethylhexyl, dodecyl, octadecyl or myricyl radical; any alkenyl radical such as the vinyl, allyl, hexenyl, 3,7-dimethyl-6-octenyl or octadecenyl radical; any cycloalkyl radical such as the cyclopropyl, cyclobutyl or cyclohexyl radical; any cycloalkenyl radical such as the cyclopentenyl or cyclohexenyl radical; any aryl radical such as the phenyl, naphthyl or biphenyl radical; any alkaryl radical such as the tolyl or 2,4-dimethylphenyl radical or any aralkyl radical such as the benzyl, 2-phenylethyl or xylyl radical.

Each X can be any halogen atom having an atomic weight greater than 30, i.e. chlorine, bromine or iodine. It is preferable that at least some X atoms be iodine in any reaction system of this invention.

The zinc employed in this invention is in powdered form. For economic reasons, electrolytic zinc is preferred, especially such dust having an average particle size ranging from about 10 to 100 microns in its greatest linear dimension.

The triorganoaluminum compound, organic halide and zinc reactants of the present invention are employed in a molar ratio of about 1:1:1. The reaction whereby diorganozinc compound is formed is run in a closed system under an inert atmosphere, preferably in the presence of an organic liquid which is a mutual solvent for both the triorganoaluminum compound and the organic halide. The solvent is used in such amounts as to provide a liquid or fluid mass. Suitable solvents include, for example, benzene, xylene, hexane, and octane or such ethers as dimethyl ether, methyl ethyl ether, diisopropyl ether, diethyl ether and the like. The inert atmosphere can be an inert gas, e.g. krypton, argon, helium or nitrogen, or a vapor of one of the reactants, e.g. an organic halide such as ethyl chloride, or a vapor of the mutual solvent.

The reactants employed in this invention are maintained together at a temperature and for a time sufficient to produce the desired diorganozinc product. The latitude of the temperature is such that the reaction can be conducted at from about 0° C. up to the decomposition temperature of the reactants or the desired product. However, it is preferable to conduct the reaction at a temperature of about 20° C. to 150° C., more preferably from about 90° C. to 110° C. The time for the reaction is from several minutes to several hours, e.g. from about 5 minutes to 20 hours. For most cases, the reaction time will be found to be about 2 or 3 hours to about 7 or 8 hours. When the reaction is adjusted to operate at optimum conditions, maximum yield of pure product is obtained with minimal degradation of the products.

Although the reaction is normally run at atmospheric pressure, it can be run at sub-atmospheric or super-atmospheric pressures. The reaction can be batch or continuous.

The products of the reaction employed in this invention can be separated by distillation, preferably by vacuum distillation. Diethylzinc, for example, has a boiling point of about 27° C. at 10 millimeters pressure while diethylaluminum chloride has a boiling point of about 91° C. at 10 millimeters pressure. Separation and purification of diorganozinc products becomes impractical when the total carbon content reaches about 14 carbon atoms per molecule. For the higher molecular weight products, separation and purification can be accomplished by alternative standard methods such as crystallization, selective solvent extraction or use of selective complexing agents.

The triorganoaluminum compounds and organic halides employed in this invention are prepared by known methods and many are commercially available. In general, it is preferred that the organic radicals are low molecular weight alkyl radicals for both components, i.e. alkyl radicals having up to about 12 carbon atoms and more preferably no more than about 7 carbon atoms. The lower alkyls are preferred due to the ease of separation and commercial acceptance of the particular products.

The stepwise addition of the components to the reactor is subject to many variations as long as all three reactants are combined. The reactants may be combined simultaneously or may be admitted to the reactor in any desirable sequence. Preferably, the zinc dust and the triorganoaluminum compound are mixed together (with a solvent where the triorganoaluminum compound is a solid), the mixture is then heated to the desired temperature and the organic halide is added to the heated mixture.

The diorganozinc products of the present invention are useful as intermediates in the preparation of other organo metallic compounds such as tetraethyl lead or ethyl sodium. They are also useful as catalysts for polymerizing olefins and olefin oxides into film and fiber-forming polymers.

The following examples are illustrative and are not intended to limit this invention which is properly delineated in the claims.

EXAMPLE 1

Equimolar amounts of triethylaluminum and electrolytic zinc dust were charged into a closed reactor under a nitrogen atmosphere of one atmosphere absolute pressure. The mixture was stirred and heated in the range of 90° to 110° C. Ethyl chloride was bubbled through ethyl iodide and passed into the closed reactor during heating until a slight excess of ethyl chloride had been introduced into the reactor. The diethylzinc was then distilled out of the reactor under vacuum after initial removal of traces of more volatile substances, such as the excess ethyl chloride.

EXAMPLE 2

When a mixture of isobutyl bromide and isobutyl iodide in a molar ratio of 29:1 and tri-isobutylaluminum are substituted mol per mol for the ethyl chloride and triethylaluminum, respectively, in the procedure of Example 1, di-isobutyl zinc is the distillable product.

EXAMPLE 3

Due to the catalytic nature of triorganoaluminum compounds with unsaturated aliphatic hydrocarbon compounds, the triorganoaluminum compounds which contain unsaturated aliphatic monovalent hydrocarbon radicals exist only as adducts or complexes with such materials as ethers and amines.

When an equimolar mixture of vinyl chloride and vinyl bromide are passed into a closed reactor containing a stirred mixture of equimolar amounts of trivinylaluminum and trimethylamine (added as a trivinylaluminum-trimethylamine adduct) and electrolytic zinc dust under a nitrogen atmosphere of one atmosphere absolute pressure while the reactor is being heated to and in the range of 90° to 110° C. until a slight excess of the vinyl chloride-vinyl bromide mixture has been introduced to the reactor, there is produced divinylzinc, which can be separated from the product mixture by vacuum distillation after removal of the more volatile substances such as the excess vinyl chloride and vinyl bromide.

EXAMPLE 4

Equimolar amounts of electrolytic zinc dust and an equimolar mixture of cyclohexyldimethylaluminum are charged into a closed reactor under a nitrogen atmosphere of one atmosphere absolute pressure. The mixture is stirred and heated in the range of 100° to 130° C. Cyclohexylbromide is passed into the closed reactor during heating until a slight excess is present. The product is a distillable mixture containing methylcyclohexylzinc and dicyclohexylzinc.

EXAMPLE 5

Equimolar amounts of electrolytic zinc dust and triphenylaluminum are charged into a closed reactor with xylene as a solvent under a nitrogen atmosphere of one atmosphere absolute pressure. The mixture is stirred and heated in the range of about 130–140° C. Iodobenzene is passed into the closed reactor during heating until a slight excess is present. The product is diphenylzinc, a distillable solid.

When tribenzylaluminum and tritolylaluminum are each substituted mol per mol for the triphenylaluminum and benzyl iodide and an iodotoluene are correspondingly substituted mol per mol for the iodobenzene in the above preparation, the respective products are ditolylzinc and dibenzylzinc.

Having thus described my invention, I claim:

1. A process for the preparation of diorganozinc compounds comprising mixing zinc dust, a triorganoaluminum compound of the formula $AlR_3$ and an organic halide of the formula $RX$, wherein each R is a monovalent hydrocarbon radical and each X is a halogen atom having an atomic weight above 30, at a temperature and for time sufficient to produce a diorganozinc compound.

2. The process of claim 1 wherein the temperature ranges from about 20° C. to about 150° C.

3. The process of claim 1 wherein each R is a monovalent hydrocarbon radical containing no more than about 18 carbon atoms.

4. The process of claim 1 wherein each R is an alkyl radical containing no more than about 12 carbon atoms.

5. The process of claim 2 wherein each R is a monovalent hydrocarbon radical containing no more than about 7 carbon atoms.

6. The process of claim 2 wherein each R is an alkyl radical containing no more than about 6 carbon atoms.

7. The process of claim 6 wherein at least some X atoms are iodine atoms.

8. The process of claim 7 wherein each R is an ethyl radical.

9. The process of claim 8 wherein the temperature ranges from about 90 to 110° C.

References Cited

UNITED STATES PATENTS

| | | | |
|---|---|---|---|
| 2,786,860 | 3/1957 | Ziegler et al. | |
| 3,057,894 | 10/1962 | Robinson | 260—429.9 |
| 3,124,604 | 3/1964 | Huther | 260—429.9 |

OTHER REFERENCES

Coates, Organometallic Compounds, New York, John Wiley & Sons, Inc. (1960), p. 64.

Sheverdina, Doklady Akademii nauk SSSR, Abstract of Vol. 124, No. 3, pp. 602–605 (1959).

Zeiss, Organometallic Chemistry, Reinhold Publ. Corp., New York, p. 249 (1960).

TOBIAS E. LEVOW, Primary Examiner

H. M. S. SNEED, Assistant Examiner